Sept. 14, 1926.  
J. MILICI ET AL  
1,600,123  
CONVERTIBLE GRINDING MACHINE  
Filed Feb. 24, 1926  
2 Sheets-Sheet 1

Joseph Milici  
Vito Esposito  
INVENTOR  
BY Victor J. Evans  
ATTORNEY

WITNESS:

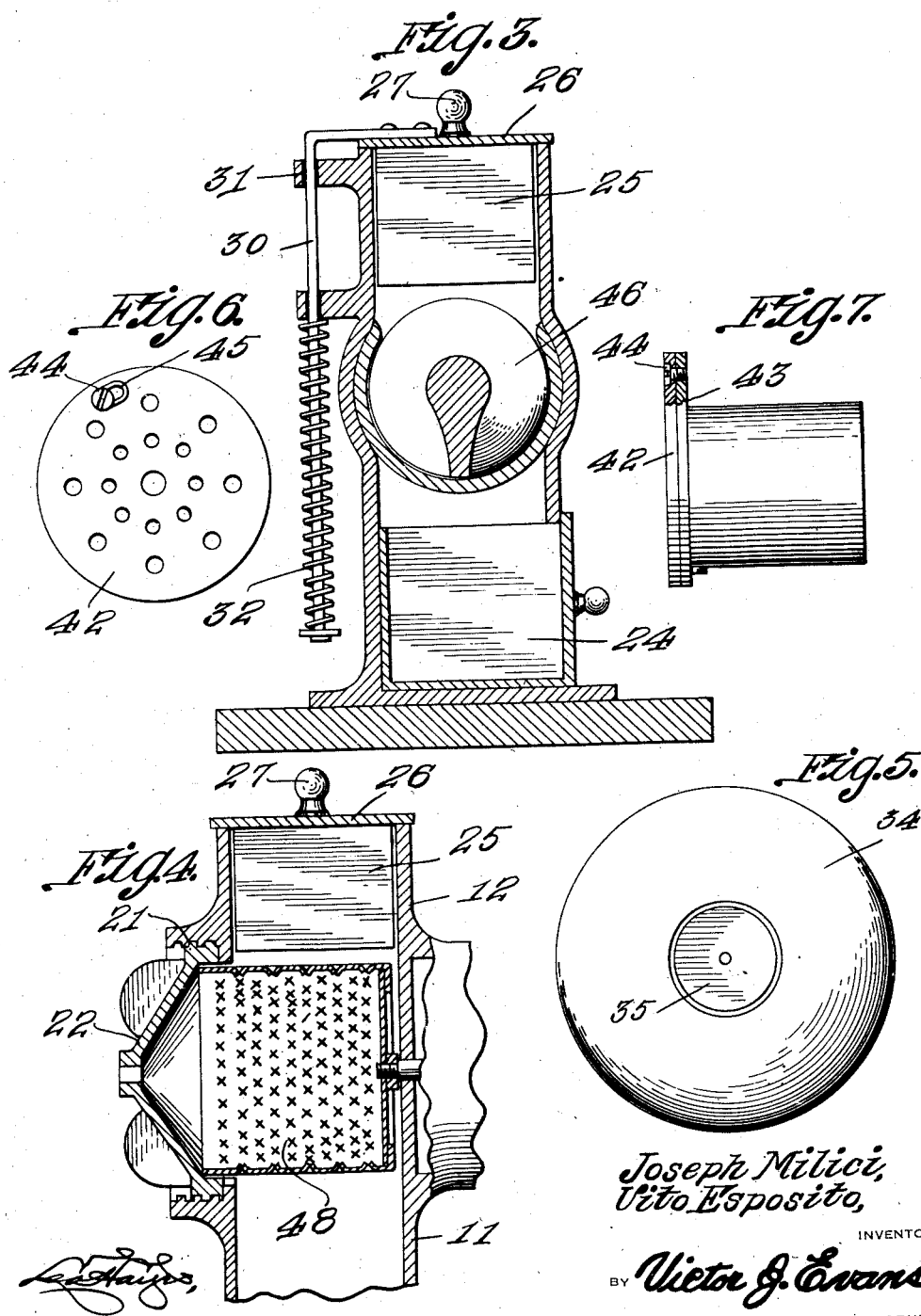

Patented Sept. 14, 1926.

1,600,123

UNITED STATES PATENT OFFICE.

JOSEPH MILICI AND VITO ESPOSITO, OF PHILADELPHIA, PENNSYLVANIA.

CONVERTIBLE GRINDING MACHINE.

Application filed February 24, 1926. Serial No. 90,377.

This invention relates to a convertible food treating or grinding machine and has for its object the provision of a novel device adapted for use as an egg beater, knife sharpener, food grinder, coffee grinder, potato peeler and the like, the various elements being interchangeable so that the machine may be used for one purpose or the other as desired.

An important object is the provision of a machine of this character which is electrically driven and which therefore has embodied therein as a permanent part thereof a suitable electric motor which may be operated by either direct or alternating current.

Another object is to provide a machine of this character provided with a removable guide device so that if desired, the machine may be used for grinding meat or other foods, the guide device being replaceable by a cap so that if preferred the machine may be used for grating cheese, peeling potatoes or other vegetables and acting in other capacities.

Still another object is to provide a novel form of feed mechanism so that in case food products of any kind are to be ground or grated, or either peeled, they will be fed to the rotary abrasive element.

An additional object is to provide a machine of this character which will be comparatively simple and inexpensive in manufacture, easy to use, positive in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, in which—

Figure 1 is a vertical section taken through the device illustrating it in use as a cheese grater and also showing the attachment for use in beating eggs, whipping cream or the like.

Figure 3 is a cross sectional vertical view taken at right angles to Figure 2 and showing the feed device.

Figure 4 is a view similar to Figure 1, only a part being shown, this view disclosing a potato or other vegetable peeling drum device, and Figures 5, 6 and 7 are detail views of certain features.

Figure 1:
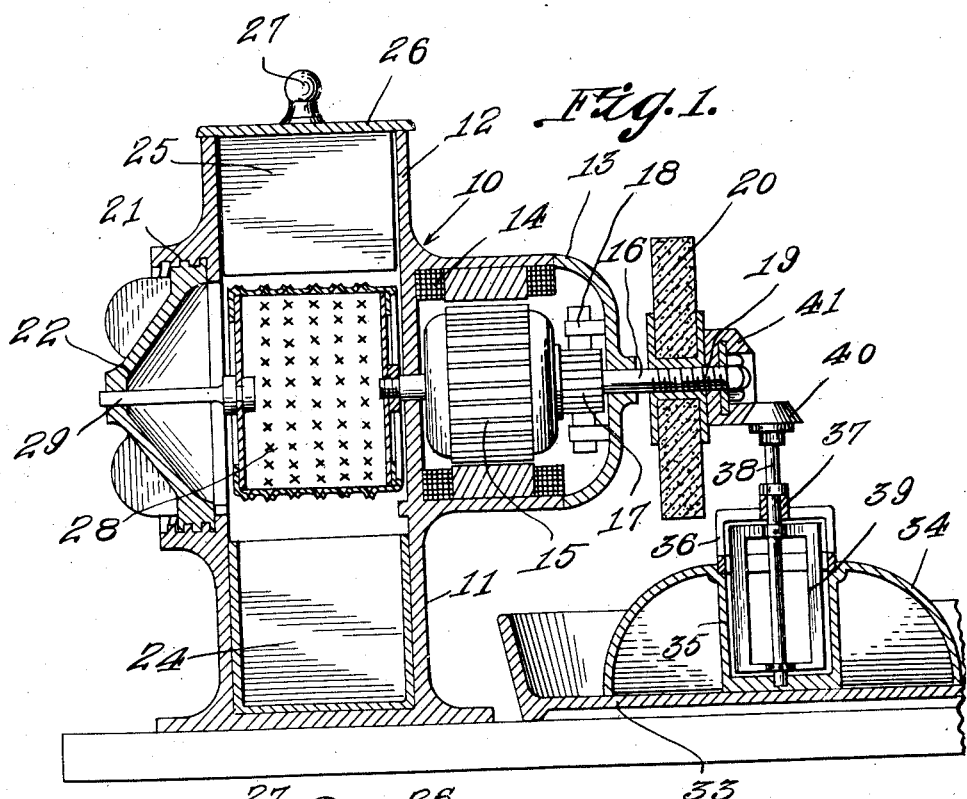

Referring more particularly to the drawings, we have shown the device as comprising a hollow body or casing indicated generally by the numeral 10, which casing includes a vertically extending base portion 11 with which alines a hopper portion 12, the casing further including a horizontally extending portion within which is built an electric motor including the usual field coils 14 within the confines of which is mounted the rotatable armature 15 carried by a shaft 16 carrying the usual commutator 17 cooperating with brushes 18. There is nothing distinctive in the mode of construction except that it forms a permanent part of the machine.

The motor shaft is extended and preferably threaded as indicated at 19 so as to have engaged thereon a grinding wheel 20 capable of use for sharpening knives or other devices. It will be observed that the wall of the casing member 10 constitutes a closure for one end of the casing portion 13 within which is located a motor, the only opening being one provided for the journal box or bearing for the end of the motor shaft 16.

Figure 2:
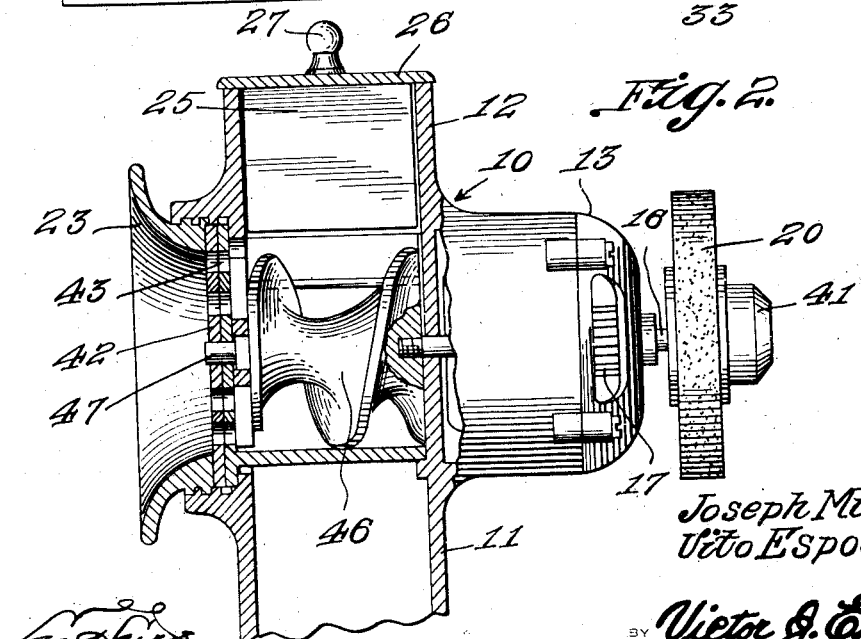
Figure 2 is a view similar to Figure 1 but showing the device arranged as a meat or other food grinder.

At a point coaxial with the motor, the outer or end wall of the casing member 10 is provided with an opening 21 which is threaded and with which may be engaged a cap or closure 22, as shown in Figures 1 and 4, or an open flaring guide device 23 as shown in Figure 2, depending upon the work to be performed by the machine.

It is of course intended that the lower portion 11 of the casing be capable of having inserted therein a receptacle 24 for the reception of the ground material and that a suitable follower 25 may be engaged within the upper portion 12 of the casing, the follower being for the purpose of feeding downwardly any material or articles to be ground or otherwise treated as will be explained, this follower carrying a cap member or cover 26 which may form a part thereof and which is equipped with a handle 27.

In case the device is to be used as a cheese grater or the like, we provide a drum 28 located within the intermediate portion of the casing 10 and carrying a shaft element 29 journaled centrally through the cap 22, the drum being detachably connected with the projecting end of the motor shaft 16 as clearly indicated in Figure 1. In this event, the follower 25 comes into play inasmuch as it must be first removed to permit the insertion of the cheese or the like to be grated, subsequently to which the follower is replaced and pressed down either by hand or by means of the feeding device illustrated in Figure 3 which discloses an angular arm or rod member 30 connected at one end with the follower, slidable through suitable guides 31 and equipped with a coil spring 32 tending to force it downwardly. When the drum is in position as indicated in Figure 1 and the motor set in operation, it is quite clear that the cheese or other food product will be efficiently grated by the rotary drum.

The device is also capable of use as a grinding machine for sharpening knives or the like and when this is desired the grinding wheel 20 is engaged in place upon the shaft 16, it being quite clear that this grinding wheel might be replaced by a buffing wheel, brush or other element in case other work is to be performed by the machine.

Attention is directed to the fact that the machine is capable of use as an egg beater and in this capacity it will be noted, in Figure 1, that we have provided a receptacle 33 within which is disposed an inverted semi-spherical shell member 34 at the center of which is a cup-like member or socket 35 provided at its top with a frame or spider 36 equipped with a bearing 37 through which is journaled a shaft 38 carrying, at its lower end, a beater structure 39 and equipped at its upper end with a gear or friction wheel 40 meshing or engaging with a corresponding element 41 on the projecting end of the motor shaft 16. Clearly, when this auxiliary structure is in position, and the motor set in operation, the beater 39 will act to beat eggs, whip cream or perform other similar functions.

The machine is also capable of employment for grinding meat or other food products instead of grating them as above described, and when this is done, the cap member 22 above mentioned and shown in Figure 1 is removed and replaced by the outwardly flaring open ended guide device 23 which is likewise above mentioned. Located between this guide device and the central portion of the casing 10 is the usual type of perforated disk 42 adjacent which is located a similarly perforated disk 43, relative rotative adjustment being effected as for instance by means of a securing screw 44 passing through a slot 45 in either disk and engaging through a corresponding threaded hole in the other, the purpose being that these disks may be adjusted to bring the perforations or holes therein more or less into registration depending upon the fineness desired in the grinding of the materials. Furthermore, when the device is used as a food grinder the above described drum 28 is removed and replaced by a screw or auger member 46 which is detachably engaged upon the projecting end of the motor shaft 16 and which carries a stub or extension shaft 47 journaled through suitable bearing openings in the centers of the disks 42 and 43. Obviously, when the auger member or screw 46 is applied and the flaring member or guide 23 likewise applied, material fed to the device through the hopper portion 12 of the casing will be forced through the holes in the disks 42 and 43, these holes acting as dies in a well known manner so that the material will be effectually ground up.

In Figure 4, we have illustrated a slight modification, in which the drum 28 disclosed in the first figure and first form of the invention is replaced by a drum 48 of slightly different form inasmuch as the surface thereof is intended not to grate or grind but simply to remove or abrade the skin from vegetables such as potatoes, carrots, parsnips or the like. The drum member 48 is mounted in identically the same manner as the drum member 28, there being no distinction whatsoever except in so far as the surface is concerned, this difference being only on account of the difference in the work to be done.

From the foregoing description and a study of the drawings, it is believed that the construction, operation and advantages will be readily apparent to one skilled in the art without further explanation.

While we have shown and described the preferred embodiment of the invention, it should be understood that we reserve the right to make such changes in the form, construction and arrangement of parts as will not depart from the spirit of the invention or the scope of the subjoined claim.

Having thus described the invention, we claim:

In a convertible machine of the character described, a casing including a base portion of hollow formation and adapted to contain a receptacle, the casing further including an intermediate horizontal portion constituting a motor housing and additionally including an upper or hopper portion arranged in vertical alinement with the base portion, said intermediate portion of the casing having an opening in alinement with the horizontal casing portion, a selectively usable cap and guide means disposable at said opening, an electric motor mounted within said horizontal portion, a rotary element mounted within the intermediate portion of the casing and connected with the motor to be driven thereby.

In testimony whereof we affix our signatures.

JOSEPH MILICI.
VITO ESPOSITO.